Sept. 24, 1946.    L. I. PICKERT    2,408,123
VARIABLE LOAD BRAKE
Filed Dec. 9, 1944    2 Sheets-Sheet 2
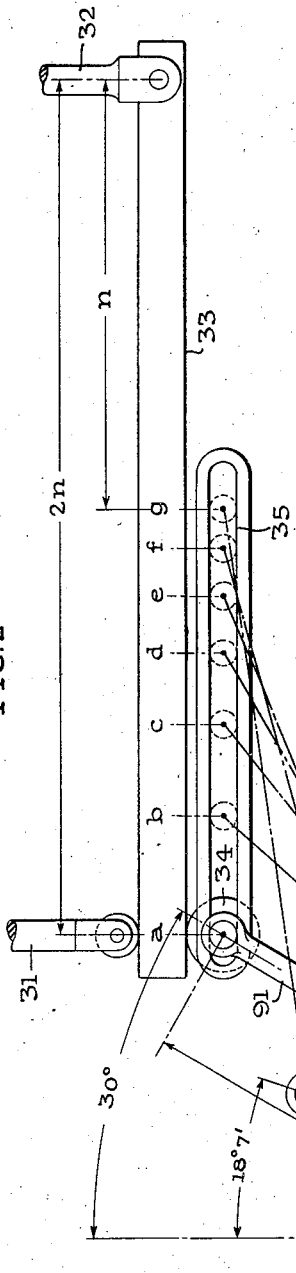
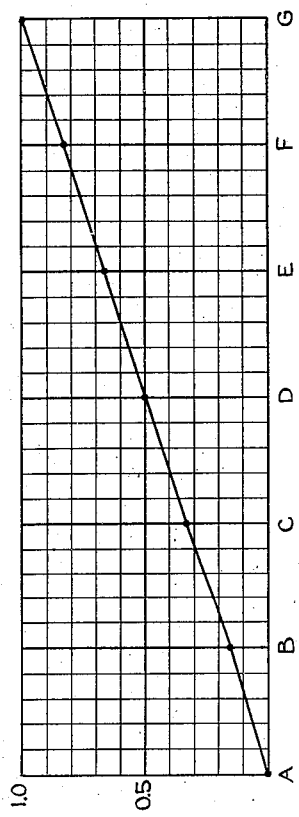
Inventor
Lynn I. Pickert Patented Sept. 24, 1946

2,408,123

UNITED STATES PATENT OFFICE 2,408,123

VARIABLE LOAD BRAKE

Lynn I. Pickert, Watertown, N. Y., assignor to The New York Air Brake Company, a corporation of New Jersey Application December 9, 1944, Serial No. 567,337

7 Claims. (Cl. 303—22)

This invention relates to air brakes and particularly to variable load brakes of the type using a variable ratio relay which translates a controlling pressure into a proportionally related braking pressure. By adjusting the relay ratio on each car in a train according to load on the particular car, the brakes on all the cars in a train can be caused to function harmoniously.

With brakes of this type it is known practice to use a relay whose variable ratio is secured by adjusting a lever mechanism. It is difficult to construct such a mechanism with a straight-line characteristic. By straight-line characteristic is meant a characteristic such that the ratio of controlled pressure to controlling pressure will vary proportionally to the lineal displacement of the adjusting part. A straight line characteristic is needed if the relay is to be set automatically in response to the load on the car. Prior art relays have "curved" characteristics.

Because of the curved characteristic of prior art adjustable relays, braking pressures have been varied heretofore in response to load but not even approximately in proportion to load, the ratio (as a rule) increasing slowly with load in the low load ranges and much more rapidly in the higher ranges so that compromise was necessary.

The invention provides a very simple compensating linkage which can be used to give a nearly straight characteristic.

The principle can be variously embodied and can be applied to different types of braking system. It will be here described as used to adjust the fulcrum of a lever of the first class. Such adjustment varies the two lever arms in reverse senses. Other lever mechanisms have similar characteristics and hence permit use of the principle underlying the invention.

Simply as a basis of disclosure the invention will be described as used in a brake system having a light brake cylinder (sufficient to brake an unloaded car) and a load brake cylinder. The pressure in the light brake cylinder is used as the controlling pressure on the relay, and the relay establishes a related pressure in the load brake cylinder. Thus the total braking effect is determined by the adjustment of the relay and the adjustment of the relay is effected automatically in response to load.

To avoid wear on the parts it is desirable to make this adjustment only periodically and the usual practice is to make the adjustment as an incident to charging of the brake pipe. This charge occurs when a car is cut into a train so that each car is adjusted for load when it is so cut in.

As a preferred device of the class above mentioned a variable load brake invented by Henry N. Sudduth and described in an application Serial No. 565,130 has been chosen.

The invention will now be described by reference to the accompanying drawings in which:

Figure 2 is a diagram of the compensating mechanism on a larger scale.

Figure 3 is a plot of the ratio characteristic of the relay as corrected by the compensating mechanism. In this figure positions of the load sensing element are plotted as abscissae while ordinates give the corresponding ratios of pressure in the load cylinder to pressure in the light cylinder expressed as decimal fractions.

Figure 1:
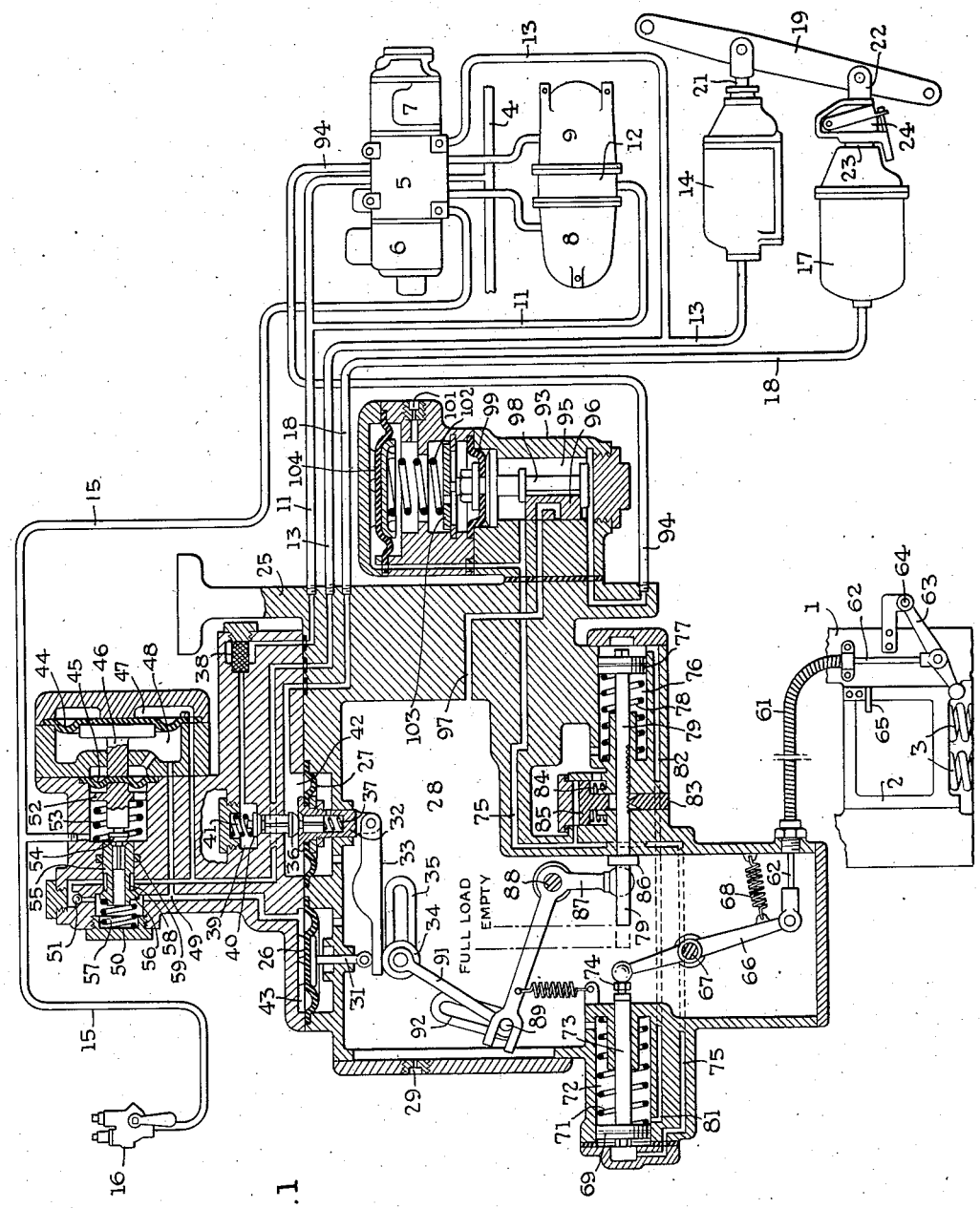
Figure 1 is a diagrammatic section of the load controlling mechanism drawn on as large a scale as conditions permit and shown connected to the brake cylinders, reservoirs, AB valve and retainer, all drawn in miniature.

The drawings show a workable embodiment, but are diagrammatic to the extent that all ports are shown in a single plane. More compact commercial arrangements can readily be designed according to well known principles.

The drawings show the system uncharged and under "no load" conditions.

Since the car truck and the AB brake valve are basic elements to which the invention is applied, these will be described first to develop the environment in which the invention will be used.

Pedestals of a conventional car truck are illustrated at 1 and the truck bolster at 2. Springs 3 support the bolster on the truck. The bolster is shown at its uppermost (unloaded) position from which load on the car will depress it relatively to the pedestals. Thus its depression downward from the illustrated position is a function of the load imposed on the car.

The brake pipe of an automatic air brake system extends from end to end of the car. Such brake pipes are connected from car to car by the usual angle cocks and coupled hose and charging and venting of the brake pipe are controlled by the usual engineer's brake valve on the propelling unit. In the drawing only a fragment 4 of the brake pipe is illustrated, since its connections and control follow standard practice.

The brake pipe 4 is connected to the pipe bracket 5 on which are mounted the emergency portion 6 and service portion 7 of the AB brake valve. Piped individually to bracket 5 are the emergency reservoir 8 and the auxiliary reservoir 9. From bracket 5 a branched pipe 11 leads to a supplemental reservoir 12 and to the variable load mechanism. A supplemental reservoir 12 is not used with the regular AB brake valve, but is here provided to furnish air to the load cylinder. It is charged directly from brake pipe 4 through a check valve and a flow-restricting choke which are not shown but would desirably be mounted in bracket 5. It is known practice so to charge a supplemental reservoir where one is needed to actuate a load brake cylinder. Consequently illustration of the path for charging the supplemental reservoir 12 is deemed unnecessary.

The usual brake cylinder pipe 13 leads to the light brake cylinder 14 and has a branch leading to the variable load mechanism to be described. The retainer pipe 15 leads to the usual retainer 16 and has a branch leading to the variable load mechanism.

The above named components except the parts 11 and 12 and the connections to the variable load mechanism are standard AB valve and freight car equipment. To these are added a load sensing mechanism and a variable load relay valve which controls the load cylinder.

The variable load mechanism controls admission and exhaust of motive air to and from the load brake cylinder 17 by way of load cylinder pipe and passage 18. The piston in light cylinder 14 operates lever 19 through the usual push-rod 21. Cylinder 14 always operates in advance of load cylinder 17 and so causes lever 19 to draw push-rod 22 outward relatively to the still retracted tubular piston rod 23 of cylinder 17. The distance moved depends on the running slack. When load cylinder 17 is operated latch 24 clutches piston rod 23 to push-rod 22. The clutch is of a type which disengages only when piston rod 23 retreats to its full release (innermost) position.

The cylinder and latch arrangement is in daily use in light and load brakes, and since its functions are familiar, requires no detailed description.

The variable load mechanism is enclosed in a housing generally indicated at 25 and made up of castings having the necessary ports and passages hereinafter described. Pipes and passages which are in free communication with one another are designated by the same reference numeral in order to minimize the use of reference numerals on the drawings and simplify the description.

The relay proper comprises two movable abutments, shown as flexible diaphragms 26 and 27 of equal areas. These are clamped at their margins between separable portions of the housing as shown. Each is subject on its lower face to atmospheric pressure, the spaces below the diaphragms being open to the chamber 28 which is vented to atmosphere at 29. The chamber 43 above diaphragm 26 is subject at certain times to pressure developed in the light brake cylinder 14. It reacts downward on the enlarged head of the vertically guided thrust member 31. The diaphragm 27 carries at its center a ported hub 32. The lower end of the hub 32 is pinned to the righthand end of a lever 33, the other end of which is in thrust engagement with a thrust roller on the lower end of the thrust member 31. The lever 33 has a shiftable fulcrum which takes the form of a roller 34 whose journal is guided horizontally by a fixed guide slot 35. The port through hub 32 is controlled by a poppet type exhaust valve 36 which is biased in an opening direction (upward) by a coil compression spring 37 mounted in the hub beneath it.

The pipe 11 already described as connected to the supplemental reservoir 12 leads through a strainer 38 to a chamber 39 in the body 25. A poppet inlet valve 40 which opens toward the chamber 39 is biased in a closing direction by an overlying coil compression spring 41 as shown and has a downward extending pilot which is aligned with and arranged to enter into thrust engagement with the exhaust valve 36. The parts are so arranged that if the diaphragm 27 is forced upward, the effect is first to seat the exhaust valve 36 and then unseat the inlet or supply valve 40 admitting air from the supplemental reservoir 12 to the space 42 above the diaphragm. The space 42 is connected by the passage and communicating pipe 18 with the load cylinder 17.

During brake applications and after a definite pressure has been developed in the light cylinder 14, the pressure acting in the light cylinder 14 is permitted to act in the space 43 above the diaphragm 26. This action is timed and controlled by a pilot valve mechanism. This comprises a differential pair of diaphragms, namely a large diaphragm 44 and a smaller diaphragm 45 reacting upon one another at their centers in one way thrust through a stem 46 which is guided to move longitudinally. The space 47 to the right of the large diaphragm 44 is in free communication with the pipe 13 and consequently with the light cylinder 14. The space 48 between the two diaphragms is connected by a branched passage 49 with the chamber 43 above diaphragm 26 and with a valve chamber 50. A by-pass check valve 51 permits flow from chamber 50 to passage 13.

A spider 52 is biased to the right as viewed in the drawings by a coil compression spring 53 and is in thrust engagement with diaphragm 45 and stem 46. It carries on its end a release valve 54 of the poppet type. The valve 54 controls a seat formed in the end of a tubular stem 55 of a poppet valve 56 which opens when moved in a lefthand direction and which is biased closed by a coil compression spring 57. The pilot of valve 54 is guided in the bore of the stem 55. There is an annular groove 58 which encircles the tubular stem and which is in communication at all times with the brake cylinder passage 13. There is packing 59 around stem 55 to the right of groove 58.

The space to the left of the diaphragm 45, in which the spring 53 and spider 52 are mounted, is in free communication with the retainer pipe 15.

With the parts in the release position shown in the drawings the spring 53 holds the diaphragms 44 and 45 to the right so that the exhaust valve 54 is open and so that the valve 56 is closed by a spring 57. Consequently chamber 43 above diaphragm 26 is disconnected from the light brake cylinder 14 and is connected to the retainer pipe. Hence it is connected freely to atmosphere if the retainer 16 is not set, and is controlled by the retainer when the latter is set.

The diaphragms 44 and 45 are of such areas and the springs 53 and 57 are of such strengths that if a pressure is developed in the light brake cylinder 14 sufficient to bring the brake shoes against the wheels, the spring 53 will be overpowered and the valve 54 will be closed. For this a brake cylinder pressure of approximately 8 lbs. will be assumed. An increase in pressure in the cylinder 14 to say 13 lbs. will overpower also the spring 57 and open the valve 56 connecting the light brake cylinder 14 with the space 43 above the diaphragm 26.

It will be observed that any pressure which is developed in the passage 49 will be admitted to the space 48 between the two diaphragms 44 and 45. The areas of the diaphragms are so chosen that as a brake application is increased in intensity the pressures in the two brake cylinders 14 and 17 tend to become equal at full service (i. e. at "full equalization"). In other words when light brake cylinder pressure corresponds to full equalization, that is approximately 50 lbs., the pressures in spaces 47 and 48 become approximately equal. In consequence the diaphragm 44 becomes ineffective. The area of the diaphragm 45 is such that it can just hold the valve 54 closed against the reaction of spring 53 when 50 lbs. pressure exists in the space 48. An increase of pressure above 50 lbs. in the space between the two diaphragms such as would occur during emergency application, will cause the diaphragm 45 to move to the left and hold the valve 56 open.

Since American railway cars are mounted on bogie trucks and since the spring suspension is in the trucks, a flexible connection is needed between a load sensing component on the truck and the fulcrum adjusting mechanism on the body. According to the invention this connection takes the form of a "Bowden wire," and is so contrived that the wire acts in tension. This last is desirable, but not strictly necessary, since a Bowden wire can be made to operate in compression.

An important feature (here illustrated but not the invention of this applicant) is an arrangement such that the Bowden wire is inert except during the load sensing operation. This greatly reduces wear.

A flexible tubular casing 61 is attached at one end to housing 25 and at the other end to a pedestal 1. It houses a flexible push-pull wire 62. The lower end of wire 62 is pinned to a feeler lever 63 pivoted at 64 in the pedestal, and capable of being drawn up until it engages a lug 65 on bolster 2. The distance it can be so drawn up diminishes as the load on the car is increased.

The upper end of wire 62 is pinned to a lever 66 which is fulcrumed near its middle on a journal 67 carried by housing 25. The wire is biased to the position shown by a tension spring 68, which is located in housing 25 rather than in pedestal 1 simply to protect it against damage.

A single acting piston 69 with return spring 71 in cylinder 72 operates a push-rod 73. This carries an adjustable head 74 which engages the upper end of lever 66 and forces it out as far as lug 65 permits. This action occurs when port 75 is put under pressure by means to be described.

Axially aligned with cylinder 72 is a somewhat smaller cylinder 76 in which a piston 77 may be forced out against a return spring 78 until the end of its rod 79 engages the end of lever 66. Air to actuate piston 77 is delivered through a side port 81 in cylinder 72 to a passage 82 which leads to the head end of cylinder 76. This assures that piston 69 must move at least a short distance before piston 77 can be energized. This is idle motion of piston 69 necessary to reach full-load position. It times the pistons so that piston 69 moves before piston 77 moves, and serves as a safeguard in the event that piston 69, or the cable 62, or related parts should fail to function. In such case piston 77 will retreat to no-load position when unlatched by the latch described below.

Rod 79 is toothed and may be locked by a latch 83 held normally engaged by spring 84 and releasable by piston 85 which is subject to pressure in passage 75.

A collar 86 on rod 79 engages one forked end of bell crank 87 which is mounted on journal pin 88 carried by housing 25. The other forked end of bell crank 87 engages a pin 89 on the lower end of link 91 connected to the journal of roller 34. The pin 89 works in a guide slot 92 in housing 25.

The use of link 91 with its ends guided by slots 92 and 35 arranged at an appropriate angle has the effect of making the force ratio of the relay vary nearly in strict proportion to the displacement of piston 77, and this in turn is approximately proportional to the load on the car. This linkage is an illustrative embodiment of the invention to which the present application for patent is directed. Various equivalent linkages can be evolved within the scope of the present invention, the general principles of which will be elaborated after description of the feeler mechanism has been completed.

To develop pressure in port 75 and then vent that port during initial charging of brake pipe 4, use is made of a cutoff valve which is the mechanism enclosed in housing 93.

A pipe 94 which is simply a branch of brake pipe 4, leads from bracket 5 to valve chamber 95 in housing 93. In chamber 95 is a seat for slide valve 96.

The end of passage 75 is exposed in this seat as is the end of an exhaust passage 97. The slide valve has a cavity as shown and is so dimensioned that in its lower position it exposes passage 75 and blanks exhaust passage 97, while in its upper position it connects passages 75 and 97.

Valve 96 is shifted by stem 98 attached to the center of flexible diaphragm 99 which is subject on its upper side to atmospheric pressure (see port 101) and on its lower side to pressure in chamber 95. The diaphragm 99 is biased downward by coil compression spring 102 which reacts through a shiftable plate 103. The stress on spring 102 is increased when port 75 is under pressure by a diaphragm 104 which serves as a spring seat and is subject to pressure in passage 75 acting on its upper side.

*Operation*

Assume that the brake pipe 4 is completely vented. There are several circumstances under which this would be the case, and under these conditions the train would be at rest either as the result of an emergency application (since these are not released until the train stops) or because the car was cut out for switching operations. It is immaterial whether the reservoirs 8, 9 and 12 are or are not partially charged, and it is immaterial what the position of the fulcrum 34 may be at the time.

Assume that, starting with the brake pipe vented, pressure is developed in the brake pipe 4. Irrespective of what happens in the AB brake valve the immediate effect in the variable load mechanism would be a rise of pressure above atmospheric pressure in the valve chamber 95 of the cutoff valve. The slide valve 96 would remain in its lowermost position as shown in Figure 1 because the spring 102 (even with the diaphragm 104 unloaded) has sufficient strength to oppose a pressure of say 15 lbs. per square inch acting upward on diaphragm 99.

Consequently passage 75 would be exposed and pressure would develop to the left of feeler piston 69 and above latch piston 85. When the pressure is sufficient to overcome spring 71, the piston will start outward and ultimately will reach a position fixed by collision of lever 63 and lug 65. Before this position is reached the side port 81 will be exposed and the latch 83 will have been released by piston 85. Release of the latch permits the piston 77 to move to the right, but ultimately the flow of pressure fluid through passage 82 would cause it to move back to the left until the end of rod 79 was arrested by collision with the upper end of lever 66. Since the piston 69 is larger and hence dominant, the bell crank lever and the fulcrum roller 34 would be positioned according to the position of lug 65 on bolster 2.

Before a brake releasing pressure is reached in the pipe 4 and say at 35 lbs. per square inch, the diaphragm 99 and connected valve 96 will move upward far enough to connect passage 75 with release port 97. At that time the pressure in the space above diaphragm 104, which had risen with pressure in passage 75, will be vented so that the stress on spring 102 will be partially relieved and a condition will be established under which valve 96 will remain in its uppermost position through all service reductions of brake pipe pressure.

The venting of passage 75 entails immediate venting of the space above latch piston 85, so that the latch re-engages, after which the cylinder 72 and finally the cylinder 76 are vented. The piston 77 cannot retreat because it is latched, but the piston 69 does retreat, permitting the spring 68 to restore the feeler mechanism to the position shown in Figure 1 so that lever 63 is moved out of the path of lug 65.

On an unloaded car the fulcrum 34 would be directly below the thrust member 31 so that the relay is inoperative and no pressure can be developed in the load cylinder 17. On a loaded car the relay is operative. At the start of a service application pressure developed in the light brake cylinder 14 is also developed in the space 47. At 8 lbs. it closes the exhaust valve 54 and at 13 lbs. it opens the valve 56, thus subjecting the relay diaphragm 26 to the pressure in the light brake cylinder 14 diminished by the 13 lbs. interval. The relay then functions through the displacement of diaphragm 27 to admit pressure fluid from supplemental reservoir 12 to chamber 42 and thence to the load brake cylinder 17. The piston of the load brake cylinder is clutched to the brake rigging as already described upon very slight initial motion of its piston. From then on the two cylinders operate in concert, the pressure in the load cylinder 17 being less than that in the light cylinder 14 by an amount which diminishes as the intensity of application is increased, the pressure difference approaching zero at full service application.

If the retainer 16 is not set when the brakes are released, the space 43 will be vented either past the exhaust valve 54 or past the ball check valve 51, while releasing flow from the load cylinder 17 will occur past the release valve 36. However, if the retainer 16 is set, the chamber 43 can be vented only at the rate determined by the retainer and to the minimum value fixed by the retainer. This is high enough to prevent the relay from moving to a position in which the release valve 36 will completely discharge the cylinder 17. The effect of the retainer, therefore, is to prevent complete release of air from the load brake cylinder 17, so that in grade cycling both cylinders 14 and 17 are controlled in the same manner and the waste of air which has heretofore been encountered through complete release of the load brake cylinder is avoided. It will be observed that in releasing operations with the retainer set the check valve 51 allows the pressure in chamber 43 to fall as pressure in cylinder 14 falls.

The characteristics of the linkage shown in Figure 1 can be explained with reference to Figures 2 and 3 which as above explained illustrate simply one of several workable linkages.

Assume that the distance between the center lines of the thrust members 31 and 32 is $2n$. The length of the link 91 as illustrated is $1.386n$, and its angularity measured from the vertical when in the position shown in Figure 1 is 30°. The angularity of the guideway 92 measured from the vertical is approximately 18° 7 minutes.

The seven positions A to G inclusive represent seven equally spaced positions of the pin 89 so that they correspond to uniform load increments between no load and full load, the position A representing no load and the position G full load. The corresponding positions $a$ to $g$ are the positions of the fulcrum 34 between no load at $a$ and full load at $g$. In the plot given in Figure 3 the abscissae represent the positions A to G and the ordinates are the corresponding ratios of the two lever arms expressed as decimal fractions. These ratios correspond to the ratios of pressure in the load cylinder to pressure in the light cylinder.

It will be observed that the plotted values fall nearly in a straight line so that the pressure in the load cylinder will be approximately directly proportional to load.

Similar results can be secured by using a link 91 of different length and a guide 92 set at different angles. For example the guide 92 may be vertical if the link has a length of $2.15n$ and the guide is so positioned that the line A—$a$ is at about 25° 48'' to the vertical.

What is claimed is:

1. In a variable load air brake for vehicles, the combination of a load sensing member guided in a definite path between limiting positions, one of which is an empty and the other a full-load position; means for positioning said load sensing member between said limits in approximate proportion to the load on the vehicle; a relay for controlling braking pressure in response to a controlling pressure, said relay including a variable ratio lever mechanism having a controlling part which is shiftable to vary the ratio of braking pressure to controlling pressure, the ratio changing at a varying rate as the controlling part is moved; and a motion-modifying setting means interposed between said sensing member and said controlling part and adapted substantially to neutralize said variation of rate, whereby said ratio will be controlled substantially in proportion to the sensed load.

2. In a variable load air brake for vehicles, the combination of a load sensing member guided in a definite path between limiting positions, one of which is an empty and the other a full-load position; means for positioning said load sensing member between said limits in approximate proportion to the load on the vehicle; a relay for controlling braking pressure in response to a controlling pressure, said relay including a lever of the first class having a fulcrum shiftable in the direction of its length; and a motion modifying means interposed between said sensing member and said movable fulcrum, and so arranged that the ratio of controlled pressure to controlling pressure effected by the relay will vary substantially in proportion to the sensed load.

3. In a variable load air brake for vehicles, the combination of a load sensing member guided in a definite path between limiting positions, one of which is an empty and the other a full-load position; means for positioning said load sensing member between said limits in approximate proportion to the load on the vehicle; a relay for controlling braking pressure in response to a controlling pressure, said relay including a lever of the first class having a fulcrum shiftable in the direction of its length; and a link serving to relate said fulcrum to said sensing member and having its ends guided in intersecting paths, the length of the link and the paths of its ends being such that the ratio of controlled to controlling pressure effected by the relay will vary substantially in proportion to the sensed load.

4. In a variable load air brake for vehicles, the combination of a load sensing member guided in a definite path between limiting positions, one of which is an empty and the other a full-load position; means for positioning said load sensing member between said limits in approximate proportion to the load on the vehicle; a relay for controlling braking pressure in response to a controlling pressure, said relay including a lever mechanism including two lever arms and a member shiftable to vary the effective lengths of both said arms in reverse senses; and a linkage serving so to relate said shiftable member to said sensing member that the ratio of controlled pressure to controlling pressure effected by the relay will vary substantially in proportion to the sensed load.

5. In a variable load air brake for vehicles, the combination of a load sensing member guided in a definite path between limiting positions, one of which is an empty and the other a full-load position; means for positioning said load sensing member between said limits in approximate proportion to the load on the vehicle; a light brake cylinder; a control valve for controlling operation of the light brake cylinder; a load brake cylinder; a relay valve mechanism serving to control pressure in the load brake cylinder in response to pressure in the light brake cylinder, said relay mechanism including a variable ratio lever mechanism having a controlling part which is shiftable to vary the ratio of load brake cylinder pressure to light brake cylinder pressure, said ratio changing at a varying rate as the controlling part is moved; and a motion-modifying means forming the operating connection between said sensing member and said controlling part and adapted substantially to neutralize said variation of rate, whereby said ratio will be controlled substantially in proportion to the sensed load.

6. In a variable load air brake for vehicles, the combination of a load sensing member guided in a definite path between limiting positions, one of which is an empty and the other a full-load position; means for positioning said load sensing member between said limits in approximate proportion to the load on the vehicle; a light brake cylinder; a control valve for controlling the light brake cylinder; a load brake cylinder; a relay valve mechanism serving to control pressure in the load brake cylinder in response to pressure in the light brake cylinder, said relay mechanism including a lever of the first class having a fulcrum shiftable in the direction of its length; and a link serving to relate said fulcrum to said sensing member and having its ends guided in intersecting paths, the length of the link and the path of its ends being such that the ratio of load brake cylinder pressure to light brake cylinder pressure effected by the relay will vary substantially in proportion to the sensed load.

7. In a variable load air brake for vehicles, the combination of a load sensing member guided in a definite path between limiting positions, one of which is an empty and the other a full-load position; means for positioning said load sensing member between said limits in approximate proportion to the load on the vehicle; a light brake cylinder; a control valve for controlling pressure in the light brake cylinder; a load brake cylinder; a relay valve mechanism serving to control pressure in the load brake cylinder in response to pressure in the light brake cylinder, said relay including a lever mechanism including two lever arms and a member shiftable to vary the effective lengths of both said arms in reverse senses; and a compensating linkage serving so to relate said shiftable member to said sensing member that the ratio of load brake cylinder pressure to light brake cylinder pressure effected by the relay will vary substantially in proportion to the sensed load.

LYNN I. PICKERT.